(12) United States Patent
Kim et al.

(10) Patent No.: US 7,868,080 B2
(45) Date of Patent: *Jan. 11, 2011

(54) GAS-BARRIER NANOCOMPOSITE COMPOSITION AND ARTICLE USING THE SAME

(75) Inventors: Myung Ho Kim, Daejeon (KR); Minki Kim, Daejeon (KR); Youngchul Yang, Daejeon (KR); Jaeyong Shin, Daejeon (KR)

(73) Assignee: LG Chem, Ltd. (KR)

( * ) Notice: Subject to any disclaimer, the term of this patent is extended or adjusted under 35 U.S.C. 154(b) by 595 days.

This patent is subject to a terminal disclaimer.

(21) Appl. No.: 11/185,496

(22) Filed: Jul. 20, 2005

(65) Prior Publication Data

US 2006/0211804 A1  Sep. 21, 2006

(30) Foreign Application Priority Data

| Jul. 21, 2004 | (KR) | .................. 10-2004-0056996 |
| Apr. 8, 2005 | (KR) | .................. 10-2005-0029580 |
| Jun. 2, 2005 | (KR) | .................. 10-2005-0047116 |

(51) Int. Cl.
   *C08K 3/34* (2006.01)
(52) U.S. Cl. .................. 524/445; 524/447; 524/449; 524/503; 524/514
(58) Field of Classification Search .................. 524/445, 524/447, 186, 503, 514
   See application file for complete search history.

(56) References Cited

U.S. PATENT DOCUMENTS

| 6,371,318 | B1 * | 4/2002 | Riffer .................. 215/347 |
| 6,407,155 | B1 * | 6/2002 | Qian et al. .................. 524/445 |
| 6,447,860 | B1 * | 9/2002 | Mueller et al. .................. 428/36.6 |
| 7,138,452 | B2 * | 11/2006 | Kim et al. .................. 524/445 |
| 7,368,496 | B2 * | 5/2008 | Kim et al. .................. 524/445 |
| 2001/0033924 | A1 | 10/2001 | Qian et al. |
| 2004/0030020 | A1 | 2/2004 | Liang et al. |
| 2004/0106719 | A1 | 6/2004 | Kim et al. |
| 2006/0094810 | A1 * | 5/2006 | Kim et al. .................. 524/445 |
| 2006/0111499 | A1 * | 5/2006 | Kim et al. .................. 524/445 |
| 2006/0121224 | A1 * | 6/2006 | Kim et al. .................. 428/35.7 |
| 2006/0121227 | A1 * | 6/2006 | Kim et al. .................. 428/36.9 |
| 2006/0121228 | A1 * | 6/2006 | Kim et al. .................. 428/36.9 |
| 2006/0122311 | A1 * | 6/2006 | Kim et al. .................. 524/445 |
| 2006/0122312 | A1 * | 6/2006 | Kim et al. .................. 524/445 |

FOREIGN PATENT DOCUMENTS

| EP | 1460109 A1 | 9/2004 |
| JP | 03-014854 B2 | 1/1991 |
| JP | 2000-007842 A | 1/2000 |
| JP | 2003-128056 A | 5/2003 |
| JP | 2004-075993 A | 3/2004 |
| JP | 2004-277740 A | 10/2004 |
| JP | 2005-206806 A | 8/2005 |
| JP | 2006-328426 A | 12/2006 |
| KR | 2003-0057307 | 7/2003 |
| KR | 10-2004-0053621 A | 6/2004 |
| KR | 1020040053621 | 6/2004 |
| TW | 2004/09796 | 6/2004 |
| TW | 200409796 A | 6/2004 |
| WO | 00/78540 | 12/2000 |
| WO | WO 02/079318 | * 10/2002 |
| WO | 03/055792 | 7/2003 |
| WO | WO 03/055792 | * 7/2003 |
| WO | 2006009360 | 1/2006 |

OTHER PUBLICATIONS

Surlyn Molding Guide, DuPont publication 2003 pp. 1-6.*
Surlyn Properties Chart, DuPont publication 2005 pp. 1-3.*
European Search Report; Application No./Patent No. 05765926.0-1214 / 1769028 PCT/KR2005002195; Dated Feb. 10, 2009.

* cited by examiner

*Primary Examiner*—Vickey Nerangis
(74) *Attorney, Agent, or Firm*—Cantor Colburn LLP

(57) ABSTRACT

Provided are a nanocomposite composition having barrier properties and an article manufactured therefrom. The composition is prepared by dry-blending a polyolefin resin, a melt blend of a resin having barrier properties and a nanocomposite having barrier properties, and a compatibilizer. The composition has superior barrier properties and moldability, and thus is useful for manufacturing a sheet or film having barrier properties.

16 Claims, 1 Drawing Sheet

(12) United States Patent
US 7,868,080 B2

GAS-BARRIER NANOCOMPOSITE COMPOSITION AND ARTICLE USING THE SAME

CROSS-REFERENCE TO RELATED PATENT APPLICATION

This application claims the benefit of Korean Patent Application No. 10-2004-0056996, filed on Jul. 21, 2004, Korean Patent Application No. 10-2005-0029580, filed on Apr. 8, 2005, and Korean Patent Application No. 10-2005-0047116, filed on Jun. 2, 2005 in the Korean Intellectual Property Office, the disclosures of which are incorporated herein in their entirety by reference.

BACKGROUND OF THE INVENTION

1. Field of the Invention

The present invention relates to a gas-barrier nanocomposite composition and an article manufactured therefrom, and more particularly, to a nanocomposite composition having superior barrier properties and moldability, which is formed by dry-blending a polyolefin resin with a melt blend of a resin having barrier properties and a nanocomposite having barrier properties and a compatibilizer, and a product manufactured therefrom.

2. Description of the Related Art

General-purpose resins, such as polyethylene and polypropylene, are used in many fields due to their superior moldability, mechanical properties, and moisture barrier properties. However, these resins are limited in their use in packaging or containers for agrochemicals and foods, which require superior chemical and oxygen barrier properties.

An ethylene-vinyl alcohol (EVOH) copolymer and polyamide resins have transparency and good gas barrier properties. However, because these resins are more expensive than general-purpose resins, their contents in products are limited.

Thus, to reduce costs, a blend of a resin having barrier properties, such as EVOH and polyamide resins, and inexpensive polyolefin was proposed. However, satisfactory barrier properties were not obtained.

To improve barrier properties, a fully exfoliated, partially exfoliated, intercalated or partially intercalated nanocomposite formed by dispersing a nano-sized intercalated clay in a polymer matrix has been used.

When a molded article is manufactured using the above-described nanocomposite, the nanocomposite should maintain its morphology having barrier property even after being molded and its moldability should be excellent to easily manufacture sheets or films as well as containers.

SUMMARY OF THE INVENTION

The present invention provides a nanocomposite composition having superior mechanical strength and superior oxygen, organic solvent, and moisture barrier properties, and superior moldability.

The present invention also provides an article manufactured from the nanocomposite composition having barrier properties.

According to an aspect of the present invention, there is provided a dry-blended composition including: 30 to 95 parts by weight of a polyolefin resin; 0.5 to 60 parts by weight of a melt blend including at least one resin having barrier properties, selected from the group consisting of an ethylene-vinyl alcohol (EVOH) copolymer, a polyamide, an ionomer and a polyvinyl alcohol (PVA) and at least one nanocomposite having barrier properties, selected from the group consisting of an EVOH copolymer/intercalated clay nanocomposite, a polyamide/intercalated clay nanocomposite, an ionomer/intercalated clay nanocomposite and a polyvinylalcohol/intercalated clay nanocomposite; and 1 to 30 parts by weight of a compatibilizer.

In an embodiment of the present invention, the resin having barrier properties and the nanocomposite having barrier properties may be molten-blended in a weight ratio from 25:75 to 75:25.

In another embodiment of the present invention, the resin having barrier properties and the nanocomposite having barrier properties may be molten-blended using a co-rotation twin screw extruder or a single screw extruder at a melting point of the resin or higher.

According to another aspect of the present invention, there is provided an article manufactured from the nanocomposite composition.

In an embodiment of the present invention, the article may be manufactured through blow molding, extrusion molding, pressure molding or injection molding.

In another embodiment of the present invention, the article may be a container, sheet, pipe or film having barrier properties.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
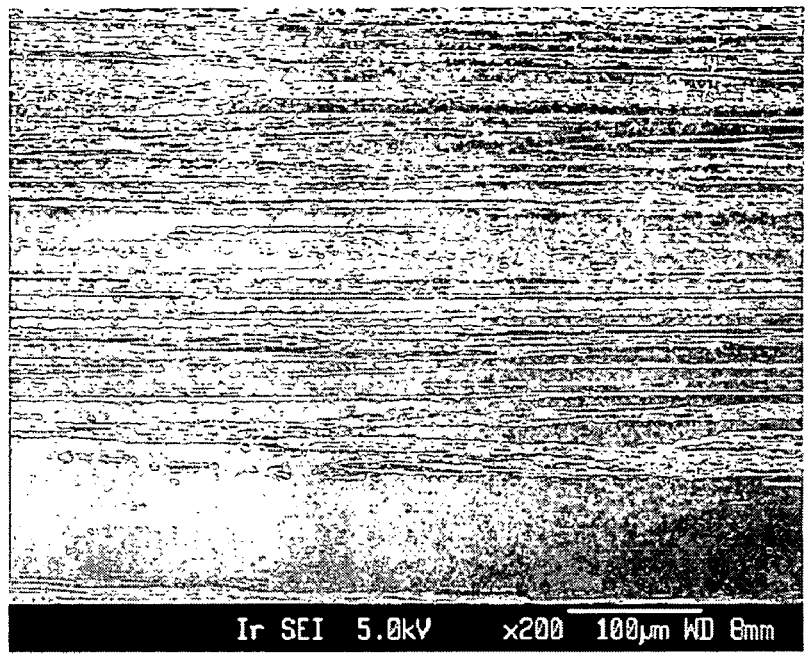
FIG. 1 is an electron microscopic photograph (×200) of the cross section of an article blow-molded from a nanocomposite composition according to an embodiment of the present invention.

The present invention will now be explained in more detail.

Korean Patent Application No. 2002-76572, previously filed by the applicant of the present application, discloses a nanocomposite blend composition including: 1 to 97 parts by weight of a polyolefin resin; 1 to 95 parts by weight of a nanocomposite having barrier properties, selected from the group consisting of an ethylene-vinyl alcohol (EVOH) copolymer/intercalated clay nanocomposite, a polyamide/intercalated clay nanocomposite, an ionomer/intercalated clay nanocomposite and a polyvinyl alcohol (PVA)/intercalated clay nanocomposite; and 1 to 95 parts by weight of a compatibilizer. This completes the present invention.

A nanocomposite composition having barrier properties of an embodiment of the present invention is obtained by dry-blending a melt blend of a resin having barrier properties and a nanocomposite having barrier properties with a polyolefin resin and a compatibilizer.

That is, the nanocomposite composition is a dry-blended composition including: 30 to 95 parts by weight of a polyolefin resin; 0.5 to 60 parts by weight of a melt blend including at least one resin having barrier properties, selected from the group consisting of an ethylene-vinyl alcohol (EVOH) copolymer, a polyamide, an ionomer and a polyvinyl alcohol (PVA) and at least one nanocomposite having barrier properties selected from the group consisting of an EVOH copolymer/intercalated clay nanocomposite, a polyamide/intercalated clay nanocomposite, an ionomer/intercalated clay nanocomposite and a polyvinylalcohol/intercalated clay nanocomposite; and 1 to 30 parts by weight of a compatibilizer.

The polyolefin resin may be at least one selected from the group consisting of a high density polyethylene (HDPE), a low density polyethylene (LDPE), a linear low density polyethylene (LLDPE), an ethylene-propylene copolymer, metallocene and polypropylene. The polypropylene may be at least one compound selected from the group consisting of a homopolymer of polypropylene, a copolymer of polypropylene, metallocene polypropylene and a composite resin having improved physical properties by adding talc, flame retardant etc. to a homopolymer or copolymer of polypropylene.

The content of the polyolefin resin is preferably 30 to 95 parts by weight, and more preferably 70 to 90 parts by weight. If the content of the polyolefin resin is less than 30 parts by weight, molding is difficult. If the content of the polyolefin resin is greater than 90 parts by weight, the barrier properties are poor.

The resin/nanocomposite melt blend can be prepared by first forming an exfoliated or partially exfoliated nanocomposite having barrier properties from the resin having barrier properties and the intercalated clay and molten-blending the nanocomposite with the resin having barrier properties. Specifically, the resin/nanocomposite melt blend can be prepared by melt blending at least one resin having barrier properties, selected from the group consisting of an EVOH copolymer, a polyamide, an ionomer and a polyvinyl alcohol (PVA) and at least one nanocomposite having barrier properties, selected from the group consisting of an EVOH copolymer/intercalated clay nanocomposite, a polyamide/intercalated clay nanocomposite, an ionomer/intercalated clay nanocomposite and a polyvinylalcohol/intercalated clay nanocomposite.

The resin having barrier properties is added to the intercalated clay to form a nano-sized exfoliated or partially exfoliated nanocomposite. Due to such a nanocomposite morphology, the passage route of gas and liquid in the resin is extended, and thus moisture and liquid barrier properties of the resin itself are improved, and the melting strength of polyolefin is increased due to the intercalated clay, which prevents drop of parison in blow molding.

The weight ratio of the resin having barrier properties to the intercalated clay in the nanocomposite is 58.0:42.0 to 99.9:0.1, and preferably 85.0:15.0 to 99.0:1.0. If the weight ratio of the resin having barrier properties to the intercalated clay is less than 58.0:42.0, the intercalated clay agglomerates and dispersing is difficult. If the weight ratio of the resin having barrier properties to the intercalated clay is greater than 99.9:0.1, the improvement in the barrier properties is negligible.

Due to the use of the melt blend of the nanocomposite and the resin having barrier properties, the processing temperature range in molding can be broader. That is, components of the blend can be selected and a blending ratio can be adjusted according to the processing temperature condition required to prepare a molded article.

To obtain the resin having barrier property/nanocomposite melt blend, molten-blending is preferably carried out at 175-270° C.

The intercalated clay is preferably organic intercalated clay. The content of an organic material in the intercalated clay is preferably 1 to 45 wt %. When the content of the organic material is less than 1 wt %, the compatibility of the intercalated clay and the resin having barrier properties is poor. When the content of the organic material is greater than 45 wt %, the intercalation of the resin having barrier properties is difficult.

The intercalated clay includes at least one material selected from montmorillonite, bentonite, kaolinite, mica, hectorite, fluorohectorite, saponite, beidelite, nontronite, stevensite, vermiculite, hallosite, volkonskoite, suconite, magadite, and kenyalite; and the organic material preferably has a functional group selected from primary ammonium to quaternary ammonium, phosphonium, maleate, succinate, acrylate, benzylic hydrogen, oxazoline and dimethyldistearylammonium.

The resin having barrier properties and the nanocomposite having barrier properties is preferably melt-blended in a weight ratio from 25:75 to 75:25. If the amount of the resin having barrier properties is too large, the barrier properties are not improved. If the amount of the resin having barrier properties is small, the impact strength of a final molded article is reduced.

If an ethylene-vinyl alcohol copolymer is included in the nanocomposite, the content of ethylene in the ethylene-vinyl alcohol copolymer is preferably 10 to 50 mol %. If the content of ethylene is less than 10 mol %, melt molding becomes difficult due to poor processability. If the content of ethylene exceeds 50 mol %, oxygen and liquid barrier properties are insufficient.

If polyamide is included in the nanocomposite, the polyamide may be nylon 4.6, nylon 6, nylon 6.6, nylon 6.10, nylon 7, nylon 8, nylon 9, nylon 11, nylon 12, nylon 46, MXD6, amorphous polyamide, a copolymerized polyamide containing at least two of these, or a mixture of at least two of these.

The amorphous polyamide refers to a polyamide having insufficient crystallinity, that is, not having an endothermic crystalline melting peak when measured by a differential scanning calorimetry (DSC) (ASTM D-3417, 10° C./min).

In general, the polyamide can be prepared using diamine and dicarboxylic acid. Examples of the diamine include hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidene, 1,4-diaminocyclohexane, 1,3-diaminocyclohexane, meta-xylenediamine, 1,5-diaminopentane, 1,4-diaminobutane, 1,3-diaminopropane, 2-ethyldiaminobutane, 1,4-diaminomethylcyclohexane, methane-xylenediamine, alkyl-substituted or unsubstituted m-phenylenediamine and p-phenylenediamine, etc. Examples of the dicarboxylic acid include alkyl-substituted or unsubstituted isophthalic acid, terephthalic acid, adipic acid, sebacic acid, butanedicarboxylic acid, etc.

Polyamide prepared using aliphatic diamine and aliphatic dicarboxylic acid is general semicrystalline polyamide (also referred to as crystalline nylon) and is not amorphous polyamide. Polyamide prepared using aromatic diamine and aromatic dicarboxylic acid is not easily treated using a general melting process.

Thus, amorphous polyamide is preferably prepared, when one of diamine and dicarboxylic acid used is aromatic and the other is aliphatic. Aliphatic groups of the amorphous polyamide are preferably $C_1$-$C_{15}$ aliphatic or $C_4$-$C_8$ alicyclic alkyls. Aromatic groups of the amorphous polyamide are preferably substituted $C_1$-$C_6$ mono- or bicyclic aromatic groups. However, all the above amorphous polyamide is not preferable in the present invention. For example, metaxylenediamine adipamide is easily crystallized when heated during a thermal molding process or when oriented, therefore, it is not preferable.

Examples of preferable amorphous polyamides include hexamethylenediamine isophthalamide, hexamethylene diamine isophthalamide/terephthalamide terpolymer having a ratio of isophthalic acid/terephthalic acid of 99/1 to 60/40, a mixture of 2,2,4- and 2,4,4-trimethylhexamethylenediamine terephthalamide, a copolymer of hexamethylenediamine or 2-methylpentamethylenediamine and an isophthalic acid, terephthalic acid or mixtures thereof. While polyamide based on hexamethylenediamine isophthalamide/terephthalamide, which has a high terephthalic acid content, is useful, it should be mixed with another diamine such as 2-methyldiaminopentane in order to produce an amorphous polyamide that can be processed.

The above amorphous polyamide comprising only the above monomers may contain a small amount of lactam, such as caprolactam or lauryl lactam, as a comonomer. It is important that the polyamide be amorphous. Therefore, any comonomer that does not crystallize polyamide can be used. About 10 wt % or less of a liquid or solid plasticizer, such as glycerole, sorbitol, or toluenesulfoneamide (Santicizer 8 monsanto) can also be included in the amorphous polyamide. For most applications, a glass transition temperature Tg (measured in a dried state, i.e., with a water content of about 0.12 wt % or less) of amorphous polyamide is about 70-170° C., and preferably about 80-160° C. The amorphous polyamide, which is not blended, has a Tg of approximately 125° C. in a dried state. The lower limit of Tg is not clear, but 70° C. is an approximate lower limit. The upper limit of Tg is not clear, too. However, when polyamide with a Tg of about 170° C. or greater is used, thermal molding is difficult. Therefore, polyamide having both an acid and an amine having aromatic groups cannot be thermally molded due to too high Tg, and thus, is not suitable for the purposes of the present invention.

The polyamide may also be a semicrystalline polyamide. The semicrystalline polyamide is generally prepared using lactam, such as nylon 6 or nylon 11, or an amino acid, or is prepared by condensing diamine, such as hexamethylenediamine, with dibasic acid, such as succinic acid, adipic acid, or sebacic acid. The polyamide may be a copolymer or a terpolymer such as a copolymer of hexamethylenediamine/adipic acid and caprolactam (nylon 6,66). A mixture of two or more crystalline polyamides can also be used. The semicrystalline and amorphous polyamides are prepared by condensation polymerization well-known in the art.

If an ionomer is included in the nanocomposite, the ionomer is preferably a copolymer of acrylic acid and ethylene, with a melt index of 0.1 to 10 g/10 min (190° C., 2,160 g).

The content of the melt blend is preferably 0.5 to 60 parts by weight, and more preferably 8 to 30 parts by weight. If the content of the melt blend is less than 0.5 part by weight, an improvement of barrier properties is negligible. If the content of the melt blend is greater than 60 parts by weight, processing is difficult.

The compatibilizer improves the compatibility of the polyolefin resin with the resin having barrier properties/the nanocomposite to form a stable composition.

The compatibilizer may be a hydrocarbon polymer having polar groups. When a hydrocarbon polymer having polar groups is used, the hydrocarbon polymer portion increases the affinity of the compatibilizer to the polyolefin resin and to the resin having barrier properties/the nanocomposite, thereby obtaining a stable composition.

The compatibilizer can include an compound selected from an epoxy-modified polystyrene copolymer, an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl methacrylate-methacrylic acid copolymer, an ethylene-butyl acrylate copolymer, an ethylene-vinyl acetate copolymer, a maleic anhydride modified (graft) ethylene-vinyl acetate copolymer, and a modification thereof.

The content of the compatibilizer is preferably 1 to 30 parts by weight, and more preferably 2 to 20 parts by weight. If the content of the compatibilizer is less than 1 part by weight, the mechanical properties of a molded article from the composition are poor. If the content of the compatibilizer is greater than 30 parts by weight, the molding of the composition is difficult.

When an epoxy-modified polystyrene copolymer is used as the compatibilizer, a copolymer comprising a main chain which comprises 70 to 99 parts by weight of styrene and 1 to 30 part by weight of an epoxy compound represented by Formula 1, and branches which comprise 1 to 80 parts by weight of acrylic monomers represented by Formula 2, is preferable.

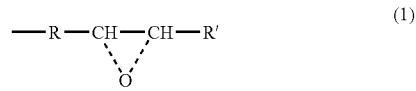

where each of R and R' is independently a $C_1$-$C_{20}$ aliphatic residue or a $C_5$-$C_{20}$ aromatic residue having double bonds at its termini

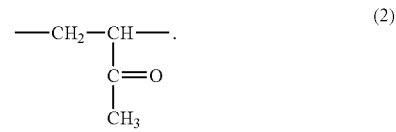

Each of the maleic anhydride modified (graft) high-density polyethylene, maleic anhydride modified (graft) linear low-density polyethylene, and maleic anhydride modified (graft) ethylene-vinyl acetate copolymer preferably comprises branches having 0.1 to 10 parts by weight of maleic anhydride based on 100 parts by weight of the main chain. When the content of the maleic anhydride is less than 0.1 part by weight, it does not function as the compatibilizer. When the content of the maleic anhydride is greater than 10 parts by weight, it is not preferable due to an unpleasant odor.

A container having barrier properties can be manufactured by molding the nanocomposite composition having barrier properties according to the present invention. Due to the dry-blended nanocomposite composition, the nanocomposite morphology having barrier properties can be maintained to obtain a molded article having good barrier properties.

The molded article may be obtained by a general molding method including blowing molding, extrusion molding, pressure molding and injection molding.

In addition to the container having barrier properties, a sheet or film having barrier properties can be manufactured.

The container or sheet having barrier properties can be a multi-layered container or film further including an adhesive layer and a polyolefin layer.

For example, the sheet or container having barrier properties can be manufacture from a 5-layered film of HDPE/adhesive/nanocomposite composition of the present invention/adhesive/HDPE.

Hereinafter, the present invention is described in more detail through examples. The following examples are meant only to increase understanding of the present invention, and are not meant to limit the scope of the invention.

EXAMPLES

The materials used in the following examples are as follows:
EVOH: E105B (Kuraray, Japan)
Amorphous nylon: SELAR 2072 (Dupont, USA)
Nylon 6,12: Zytel 158L (Dupont, USA)
Nylon 6: EN 500 (KP Chemicals)
HDPE-g-MAH: Compatibilizer, PB3009 (CRAMPTON)
HDPE: ME6000 (LG CHEM)
Ionomer: SURLYN 8527 (Dupont, USA)
Clay: Closite 30B (SCP)
Thermal stabilizer: IR 1098 (Songwon Inc.)

Preparation Example 1

Preparation of EVOH/Intercalated Clay Nanocomposite 97 wt % of an ethylene-vinyl alcohol copolymer (EVOH; E-105B (ethylene content: 44 mol %); Kuraray, Japan; melt index: 5.5 g/10 min; density: 1.14 g/cm$^3$) was put in the main hopper of a twin screw extruder (SM Platek co-rotation twin screw extruder; Φ40). Then, 3 wt % of organic montmorillonite (Southern Intercalated Clay Products, USA; C2OA) as an intercalated clay and 0.1 part by weight of IR 1098 as a thermal stabilizer based on total 100 parts by weight of the EVOH copolymer and the organic montmorillonite was separately put in the side feeder of the twin screw extruder to prepare an EVOH/intercalated clay nanocomposite in a pellet form. The extrusion temperature condition was 180-190-200-200-200-200-200° C., the screws were rotated at 300 rpm, and the discharge condition was 15 kg/hr.

Preparation Example 2

Preparation of Nylon 6/Intercalated Clay Nanocomposite 97 wt % of a polyamide (nylon 6) was put in the main hopper of a twin screw extruder (SM Platek co-rotation twin screw extruder; Φ40). Then, 3 wt % of organic montmorillonite as an intercalated clay and 0.1 part by weight of IR 1098 as a thermal stabilizer based on total 100 parts by weight of the polyamide and the organic montmorillonite was separately put in the side feeder of the twin screw extruder to prepare a nylon 6/intercalated clay nanocomposite in a pellet form. The extrusion temperature condition was 220-225-245-245-245-245-245° C., the screws were rotated at 300 rpm, and the discharge condition was 40 kg/hr.

Preparation Example 3

Preparation of Nylon 6,12/Intercalated Clay Nanocomposite 95 wt % of a polyamide (nylon 6,12) was put in the main hopper of a twin screw extruder (SM Platek co-rotation twin screw extruder; Φ40). Then, 5 wt % of organic montmorillonite as an intercalated clay and 0.1 part by weight of IR 1098 as a thermal stabilizer based on total 100 parts by weight of the polyamide and the organic montmorillonite was separately put in the side feeder of the twin screw extruder to prepare a nylon 6,12/intercalated clay nanocomposite in a pellet form. The extrusion temperature condition was 225-245-245-245-245-245-240° C., the screws were rotated at 300 rpm, and the discharge condition was 40 kg/hr.

Preparation Example 4

Preparation of Amorphous Nylon/Intercalated Clay Nanocomposite 95 wt % of a polyamide (amorphous nylon) was put in the main hopper of a twin screw extruder (SM Platek co-rotation twin screw extruder; Φ40). Then, 5 wt % of organic montmorillonite as an intercalated clay and 0.1 part by weight of IR 1098 as a thermal stabilizer based on total 100 parts by weight of the polyamide and the organic montmorillonite was separately put in the side feeder of the twin screw extruder to prepare an amorphous nylon/intercalated clay nanocomposite in a pellet form. The extrusion temperature condition was 215-225-235-235-235-235-230° C., the screws were rotated at 300 rpm, and the discharge condition was 40 kg/hr.

Preparation Example 5

Preparation of Ionomer/Intercalated Clay Nanocomposite 95 wt % of an ionomer was put in the main hopper of a twin screw extruder (SM Platek co-rotation twin screw extruder; Φ40). Then, 5 wt % of organic montmorillonite as an intercalated clay and 0.1 part by weight of IR 1098 as a thermal stabilizer based on total 100 parts by weight of the ionomer and the organic montmorillonite was separately put in the side feeder of the twin screw extruder to prepare an ionomer/intercalated clay nanocomposite in a pellet form. The extrusion temperature condition was 220-230-235-235-235-235-230° C., the screws were rotated at 300 rpm, and the discharge condition was 40 kg/hr.

Example 1

40 parts by weight of the EVOH nanocomposite obtained in the Preparation Example 1 and 60 parts by weight of EVOH were molten-blended at a temperature condition of 190-200-210-210-210-200° C. to prepare a EVOH nanocomposite/EVOH melt blend. 20 parts by weight of the melt blend was dry-blended with 70 parts by weight of HDPE and 10 parts by weight of a compatibilizer (maleic anhydride modified (graft) high density polyethylene (HDPE-g-MAH, uniroyal chemical, USA, PB3009 (1% MAH content), melt index: 5 g/10 min, density: 0.95 g/cm$^3$). Then, the blow-molding process was performed to manufacture a 1000 mL container. At this time, the temperature condition was 180-195-195-195-195-190° C. and the screws were rotated at 22 rpm. Also, the dry blend was extruded to manufacture a 30 μm thick film. At this time, the temperature condition was 185-195-195-195-195-190° C. and the screws were rotated at 16 rpm.

Example 2

40 parts by weight of the EVOH nanocomposite obtained in the Preparation Example 1 and 60 parts by weight of nylon 6 were molten-blended at a temperature condition of 215-220-210-210-210-200° C. to prepare a EVOH nanocomposite/nylon 6 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 190-225-225-220-210° C. and the screws were rotated at 23 rpm. Also, the dry blend was extruded to manufacture a 30 μm thick film. At this time, the temperature condition was 220-235-235-235-235-235° C. and the screws were rotated at 16 rpm.

Example 3

40 parts by weight of the EVOH nanocomposite obtained in the Preparation Example 1 and 60 parts by weight of nylon 6,12 were molten-blended at a temperature condition of 225-235-245-245-245-240° C. to prepare a EVOH nanocomposite/nylon 6,12 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 200-220-230-225-210° C. and the screws were rotated at 21 rpm. Also, the dry blend was extruded to manufacture a 30 μm thick film. At this time, the temperature condition was 220-235-235-235-235-235° C. and the screws were rotated at 14 rpm.

Example 4

40 parts by weight of the EVOH nanocomposite obtained in the Preparation Example 1 and 60 parts by weight of amorphous nylon were molten-blended at a temperature condition of 225-235-245-245-245-240° C. to prepare a EVOH nanocomposite/amorphous nylon melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-200-210-200-190° C. and the screws were rotated at 22 rpm. Also, the dry blend was extruded to manufacture a 30 μm thick film. At this time, the temperature condition was 220-235-235-235-235-235° C. and the screws were rotated at 16 rpm.

Example 5

40 parts by weight of the EVOH nanocomposite obtained in the Preparation Example 1 and 60 parts by weight of ionomer were molten-blended at a temperature condition of 225-235-245-245-245-240° C. to prepare a EVOH nanocomposite/ionomer melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 190-210-225-220-210° C. and the screws were rotated at 23 rpm. Also, the dry blend was extruded to manufacture a 30 μm thick film. At this time, the temperature condition was 220-235-235-235-235-235° C. and the screws were rotated at 14 rpm.

Example 6

40 parts by weight of the nylon 6 nanocomposite obtained in the Preparation Example 2 and 60 parts by weight of EVOH were molten-blended at a temperature condition of 220-235-245-245-245-240° C. to prepare a nylon 6 nanocomposite/EVOH melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-195-225-215-200° C. and the screws were rotated at 14 rpm. Also, the dry blend was extruded to manufacture a 30 μm thick film. At this time, the temperature condition was 220-235-235-235-235-235° C. and the screws were rotated at 13 rpm.

Example 7

40 parts by weight of the nylon 6 nanocomposite obtained in the Preparation Example 2 and 60 parts by weight of nylon 6 were molten-blended at a temperature condition of 220-235-245-245-245-240° C. to prepare a nylon 6 nanocomposite/nylon 6 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 195-215-220-215-200° C. and the screws were rotated at 24 rpm. Also, the dry blend was extruded to manufacture a 30 μm thick film. At this time, the temperature condition was 220-245-245-245-245-240° C. and the screws were rotated at 13 rpm.

Example 8

40 parts by weight of the nylon 6 nanocomposite obtained in the Preparation Example 2 and 60 parts by weight of nylon 6,12 were molten-blended at a temperature condition of 230-240-245-245-245-235° C. to prepare a nylon 6 nanocomposite/nylon 6,12 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 195-225-225-215-200° C. and the screws were rotated at 24 rpm. Also, the dry blend was extruded to manufacture a 30 μm thick film. At this time, the temperature condition was 220-235-235-245-245-245° C. and the screws were rotated at 12 rpm.

Example 9

40 parts by weight of the nylon 6 nanocomposite obtained in the Preparation Example 2 and 60 parts by weight of amorphous nylon were molten-blended at a temperature condition of 230-240-245-245-245-235° C. to prepare a nylon 6 nanocomposite/amorphous nylon melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-220-220-215-200° C. and the screws were rotated at 24 rpm. Also, the dry blend was extruded to manufacture a 30 μm thick film. At this time, the temperature condition was 220-235-235-235-235-235° C. and the screws were rotated at 15 rpm.

Example 10

40 parts by weight of the nylon 6 nanocomposite obtained in the Preparation Example 2 and 60 parts by weight of ionomer were molten-blended at a temperature condition of 210-225-235-235-235-230° C. to prepare a nylon 6 nanocomposite/ionomer melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-235-235-235-235-230° C. and the screws were rotated at 21 rpm.

Also, the dry blend was extruded to manufacture a 30 μm thick film. At this time, the temperature condition was 220-235-235-235-240-240° C. and the screws were rotated at 12 rpm.

Example 11

40 parts by weight of the nylon 6,12 nanocomposite obtained in the Preparation Example 3 and 60 parts by weight of EVOH were molten-blended at a temperature condition of 220-235-245-245-245-240° C. to prepare a nylon 6,12 nanocomposite/EVOH melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-225-225-215-200° C. and the screws were rotated at 21 rpm. Also, the dry blend was extruded to manufacture a 30 μm thick film. At this time, the temperature condition was 215-225-235-235-235-240° C. and the screws were rotated at 15 rpm.

Example 12

40 parts by weight of the nylon 6,12 nanocomposite obtained in the Preparation Example 3 and 60 parts by weight of nylon 6 were molten-blended at a temperature condition of 220-235-245-245-245-240° C. to prepare a nylon 6,12 nanocomposite/nylon 6 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-245-245-245-240° C. and the screws were rotated at 23 rpm. Also, the dry blend was extruded to manufacture a 30 μm thick film. At this time, the temperature condition was 205-225-235-240-240-245° C. and the screws were rotated at 12 rpm.

Example 13

40 parts by weight of the nylon 6,12 nanocomposite obtained in the Preparation Example 3 and 60 parts by weight of nylon 6,12 were molten-blended at a temperature condition of 220-235-245-245-245-240° C. to prepare a nylon 6,12 nanocomposite/nylon 6,12 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 190-215-230-230-225-210° C. and the screws were rotated at 24 rpm. Also, the dry blend was extruded to manufacture a 30 μm thick film. At this time, the temperature condition was 210-225-245-245-245-245° C. and the screws were rotated at 13 rpm.

Example 14

40 parts by weight of the nylon 6,12 nanocomposite obtained in the Preparation Example 3 and 60 parts by weight of amorphous nylon were molten-blended at a temperature condition of 220-235-235-235-235-230° C. to prepare a nylon 6,12 nanocomposite/amorphous nylon melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 190-220-225-215-200° C. and the screws were rotated at 24 rpm. Also, the dry blend was extruded to manufacture a 30 μm thick film. At this time, the temperature condition was 220-235-235-235-235-235° C. and the screws were rotated at 12 rpm.

Example 15

40 parts by weight of the nylon 6,12 nanocomposite obtained in the Preparation Example 3 and 60 parts by weight of ionomer were molten-blended at a temperature condition of 215-235-245-245-245-240° C. to prepare a nylon 6,12 nanocomposite/ionomer melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 195-225-225-225-200° C. and the screws were rotated at 22 rpm. Also, the dry blend was extruded to manufacture a 30 μm thick film. At this time, the temperature condition was 225-235-235-235-235-240° C. and the screws were rotated at 13 rpm.

Example 16

40 parts by weight of the amorphous nylon nanocomposite obtained in the Preparation Example 4 and 60 parts by weight of EVOH were molten-blended at a temperature condition of 205-215-215-215-215-210° C. to prepare an amorphous nylon nanocomposite/EVOH melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-205-215-210-200° C. and the screws were rotated at 20 rpm. Also, the dry blend was extruded to manufacture a 30 μm thick film. At this time, the temperature condition was 220-235-235-235-235-235° C. and the screws were rotated at 13 rpm.

Example 17

40 parts by weight of the amorphous nylon nanocomposite obtained in the Preparation Example 4 and 60 parts by weight of nylon 6 were molten-blended at a temperature condition of 225-235-235-235-235-230° C. to prepare an amorphous nylon nanocomposite/nylon 6 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 195-215-220-215-200° C. and the screws were rotated at 23 rpm. Also, the dry blend was extruded to manufacture a 30 μm thick film. At this time, the temperature condition was 220-235-235-235-235-240° C. and the screws were rotated at 13 rpm.

Example 18

40 parts by weight of the amorphous nylon nanocomposite obtained in the Preparation Example 4 and 60 parts by weight of nylon 6,12 were molten-blended at a temperature condition of 225-240-240-240-240-235° C. to prepare an amorphous nylon nanocomposite/nylon 6,12 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 200-220-225-215-205° C. and the screws were rotated at 22 rpm. Also, the dry blend was extruded to manufacture a 30 μm thick film. At this time, the temperature condition was 215-225-235-235-235-240° C. and the screws were rotated at 12 rpm.

Example 19

40 parts by weight of the amorphous nylon nanocomposite obtained in the Preparation Example 4 and 60 parts by weight of amorphous nylon were molten-blended at a temperature condition of 225-240-240-240-240-235° C. to prepare an amorphous nylon nanocomposite/amorphous nylon melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 190-205-215-205-195° C. and the screws were rotated at 24 rpm. Also, the dry blend was extruded to manufacture a 30 μm thick film. At this time, the temperature condition was 200-215-215-215-215-220° C. and the screws were rotated at 13 rpm.

Example 20

40 parts by weight of the amorphous nylon nanocomposite obtained in the Preparation Example 4 and 60 parts by weight of ionomer were molten-blended at a temperature condition of 225-240-240-240-240-235° C. to prepare an amorphous nylon nanocomposite/ionomer melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 195-215-220-215-205° C. and the screws were rotated at 22 rpm. Also, the dry blend was extruded to manufacture a 30 μm thick film. At this time, the temperature condition was 220-235-235-235-235-240° C. and the screws were rotated at 12 rpm.

Example 21

40 parts by weight of the ionomer nanocomposite obtained in the Preparation Example 5 and 60 parts by weight of EVOH were molten-blended at a temperature condition of 225-235-235-240-240-235° C. to prepare an ionomer nanocomposite/EVOH melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 190-215-220-215-200° C. and the screws were rotated at 24 rpm. Also, the dry blend was extruded to manufacture a 30 μm thick film. At this time, the temperature condition was 210-225-235-235-235-240° C. and the screws were rotated at 14 rpm.

Example 22

40 parts by weight of the ionomer nanocomposite obtained in the Preparation Example 5 and 60 parts by weight of nylon 6 were molten-blended at a temperature condition of 225-240-245-245-245-240° C. to prepare an ionomer nanocomposite/nylon 6 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 195-215-225-220-210° C. and the screws were rotated at 23 rpm. Also, the dry blend was extruded to manufacture a 30 μm thick film. At this time, the temperature condition was 220-235-235-235-235-240° C. and the screws were rotated at 13 rpm.

Example 23

40 parts by weight of the ionomer nanocomposite obtained in the Preparation Example 5 and 60 parts by weight of nylon 6,12 were molten-blended at a temperature condition of 225-245-245-245-245-240° C. to prepare an ionomer nanocomposite/nylon 6,12 melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 225-245-245-245-245-240° C. and the screws were rotated at 23 rpm. Also, the dry blend was extruded to manufacture a 30 μm thick film. At this time, the temperature condition was 220-235-235-235-235-240° C. and the screws were rotated at 14 rpm.

Example 24

40 parts by weight of the ionomer nanocomposite obtained in the Preparation Example 5 and 60 parts by weight of amorphous nylon were molten-blended at a temperature condition of 215-230-235-235-235-230° C. to prepare an ionomer nanocomposite/amorphous nylon melt blend. 20 parts by weight of the melt blend was dry-blended with 70 parts by weight of HDPE and 10 parts by weight of a compatibilizer. Then, the blow-molding process was performed to manufacture a 1000 mL container. At this time, the temperature condition was 185-215-220-215-200° C. and the screws were rotated at 24 rpm. Also, the dry blend was extruded to manufacture a 30 μm thick film. At this time, the temperature condition was 215-235-235-235-235-240° C. and the screws were rotated at 15 rpm.

Example 25

40 parts by weight of the ionomer nanocomposite obtained in the Preparation Example 5 and 60 parts by weight of ionomer were molten-blended at a temperature condition of 215-235-235-235-235-240° C. to prepare an ionomer nanocomposite/ionomer melt blend. 20 parts by weight of the melt blend was dry-blended with 70 parts by weight of HDPE and 10 parts by weight of a compatibilizer. Then, the nanocomposite composition was blow-molded into a 5-layered structure (HDPE/adhesive/nanocomposite composition/adhesive/HDPE) to manufacture a 1000 mL container. At this time, the temperature condition was 195-225-225-225-215° C. and the screws were rotated at 23 rpm. Also, the dry blend was extruded into a 5-layered structure (HDPE/adhesive/nanocomposite composition/adhesive/HDPE) to manufacture a 30 μm thick film. At this time, the temperature condition was 220-235-235-235-235-240° C. and the screws were rotated at 12 rpm.

Example 26

40 parts by weight of the nylon 6 nanocomposite obtained in the Preparation Example 2 and 60 parts by weight of amorphous nylon were molten-blended at a temperature condition of 230-240-245-245-245-235° C. to prepare a nylon 6 nanocomposite/amorphous nylon melt blend. 4 parts by weight of the melt blend was dry-blended with 94 parts by weight of HDPE and 2 parts by weight of a compatibilizer to obtain a nanocomposite composition. Then, the nanocomposite composition was blow-molded into a 5-layered structure (HDPE/adhesive/nanocomposite composition/adhesive/HDPE) to manufacture a 1000 mL container. At this time, the temperature condition was 195-225-225-225-215° C. and the screws were rotated at 23 rpm. Also, the nanocomposite composition was extruded into a 5-layered structure (HDPE/adhesive/nanocomposite composition/adhesive/HDPE) to manufacture a 30 μm thick film. At this time, the temperature condition was 220-235-235-235-235-240° C. and the screws were rotated at 12 rpm.

Example 27

40 parts by weight of the nylon 6 nanocomposite obtained in the Preparation Example 2 and 60 parts by weight of amorphous nylon were molten-blended at a temperature condition of 230-240-245-245-245-235° C. to prepare a nylon 6 nanocomposite/amorphous nylon melt blend. 60 parts by weight of the melt blend was dry-blended with 35 parts by weight of HDPE and 5 parts by weight of a compatibilizer to obtain a nanocomposite composition. Then, the nanocomposite composition was blow-molded into a 5-layered structure (HDPE/adhesive/nanocomposite composition/adhesive/HDPE) to manufacture a 1000 mL container. At this time, the temperature condition was 195-225-225-225-215° C. and the screws were rotated at 23 rpm. Also, the nanocomposite composition was extruded into a 5-layered structure (HDPE/adhesive/nanocomposite composition/adhesive/HDPE) to manufacture a 30 μm thick film. At this time, the temperature condition was 220-235-235-235-235-240° C. and the screws were rotated at 12 rpm.

Comparative Example 1

70 parts by weight of HDPE, 10 parts by weight of a compatibilizer and 20 parts by weight of EVOH copolymer were blended and blow-molded to manufacture a 1000 mL container. At this time, the temperature condition was 180-190-190-185-180° C. and the screws were rotated at 22 rpm. Also, the blend was extruded to manufacture a 30 μm thick film. At this time, the temperature condition was 220-235-235-235-235-240° C. and the screws were rotated at 14 rpm.

Comparative Example 2

70 parts by weight of HDPE, 10 parts by weight of a compatibilizer and 20 parts by weight of nylon 6 were blended and blow-molded to manufacture a 1000 mL container. At this time, the temperature condition was 210-220-225-215-200° C. and the screws were rotated at 21 rpm. Also, the blend was extruded to manufacture a 30 μm thick film. At this time, the temperature condition was 220-235-235-235-235-240° C. and the screws were rotated at 13 rpm.

Comparative Example 3

70 parts by weight of HDPE, 10 parts by weight of a compatibilizer and 20 parts by weight of nylon 6,12 were blended and blow-molded to manufacture a 1000 mL container. At this time, the temperature condition was 215-225-230-215-205° C. and the screws were rotated at 22 rpm. Also, the blend was extruded to manufacture a 30 μm thick film. At this time, the temperature condition was 220-235-240-240-240-245° C. and the screws were rotated at 12 rpm.

Comparative Example 4

70 parts by weight of HDPE, 10 parts by weight of a compatibilizer and 20 parts by weight of ionomer were blended and blow-molded to manufacture a 1000 mL container. At this time, the temperature condition was 205-215-225-220-215° C. and the screws were rotated at 14 rpm. Also, the blend was extruded to manufacture a 30 μm thick film. At this time, the temperature condition was 220-235-235-235-235-240° C. and the screws were rotated at 14 rpm.

For the blow-molded containers and films manufactured in Examples 1-27 and Comparative Examples 1-4, barrier properties were tested and the results were shown in Tables 1 and 2.

Experimental Example

Toluene and M15 (a mixture of 85% toluene/isooctane (50/50) and 15% methanol) were put in the containers manufactured in Examples 1-27 and Comparative Examples 1-4. Then, the weight change was determined after 15 days in a dry oven at 50° C.

The film manufactured in Examples 1-27 and Comparative Examples 1-4 were left alone under a temperature of 23° C. and a relative humidity of 50% for 1 day. Then, the gas penetration rate was determined (Mocon OX-TRAN 2/20, U.S.A).

TABLE 1

Barrier properties of containers

| | Toluene (weight loss, %) | M15 (weight loss, %) |
|---|---|---|
| Example 1 | 0.114 | 0.150 |
| Example 2 | 0.085 | 0.098 |
| Example 3 | 0.083 | 0.091 |
| Example 4 | 0.135 | 0.177 |
| Example 5 | 0.196 | 0.203 |
| Example 6 | 0.092 | 0.099 |
| Example 7 | 0.051 | 0.067 |
| Example 8 | 0.059 | 0.063 |
| Example 9 | 0.076 | 0.092 |
| Example 10 | 0.122 | 0.138 |
| Example 11 | 0.120 | 0.135 |
| Example 12 | 0.044 | 0.048 |
| Example 13 | 0.038 | 0.040 |
| Example 14 | 0.059 | 0.067 |
| Example 15 | 0.093 | 0.098 |
| Example 16 | 0.120 | 0.158 |
| Example 17 | 0.085 | 0.095 |
| Example 18 | 0.064 | 0.073 |
| Example 19 | 0.095 | 0.106 |
| Example 20 | 0.145 | 0.153 |
| Example 21 | 0.352 | 0.382 |
| Example 22 | 0.288 | 0.295 |
| Example 23 | 0.264 | 0.283 |
| Example 24 | 0.293 | 0.309 |
| Example 25 | 0.463 | 0.569 |
| Example 26 | 0.692 | 0.853 |
| Example 27 | 0.341 | 0.483 |
| Comparative Example 1 | 1.679 | 3.324 |
| Comparative Example 2 | 1.452 | 3.028 |
| Comparative Example 3 | 1.311 | 2.540 |
| Comparative Example 4 | 3.806 | 4.237 |

TABLE 2

Barrier properties of films

| | Oxygen penetration rate (ml/m² × 24 hrs 1 atm) |
|---|---|
| Example 1 | 126.27 |
| Example 2 | 93.26 |
| Example 3 | 84.26 |
| Example 4 | 143.25 |
| Example 5 | 183.49 |
| Example 6 | 92.67 |
| Example 7 | 53.69 |
| Example 8 | 63.99 |
| Example 9 | 83.28 |
| Example 10 | 134.52 |
| Example 11 | 131.48 |
| Example 12 | 52.24 |
| Example 13 | 41.38 |
| Example 14 | 62.06 |
| Example 15 | 119.42 |
| Example 16 | 133.19 |
| Example 17 | 110.42 |
| Example 18 | 77.04 |
| Example 19 | 101.06 |
| Example 20 | 235.63 |
| Example 21 | 489.18 |
| Example 22 | 432.83 |
| Example 23 | 415.90 |
| Example 24 | 441.84 |
| Example 25 | 415.49 |
| Example 26 | 538.17 |
| Example 27 | 885.92 |
| Comparative Example 1 | 2238.19 |
| Comparative Example 2 | 1324.51 |
| Comparative Example 3 | 1255.66 |
| Comparative Example 4 | 3342.01 |

As shown in Tables 1 and 2, containers and films of Examples 1 to 27 using the dry-blended composition including a polyolefin resin, a compatibilizer and a resin having barrier properties/nanocomposite melt blend have superior barrier properties to liquid and gas compared to those of Comparative Examples 1 to 4 using the composition including a polyolefin resin, a compatibilizer and a resin having barrier properties.

Figure 2:
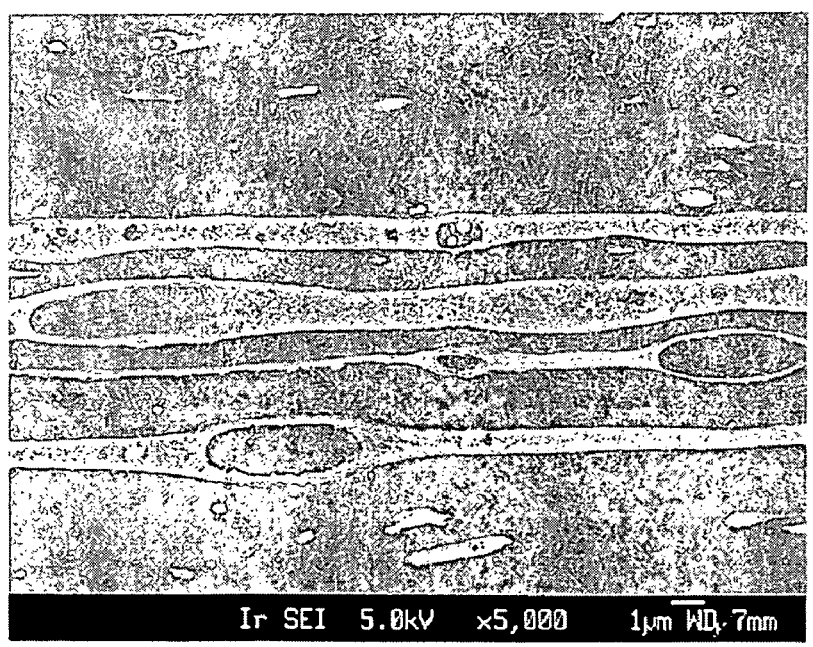
FIG. 2 is an electron microscopic photograph (×5000) of the cross section of an article blow-molded from a nanocomposite composition according to an embodiment of the present invention.

Electron microscopic photographs of the cross section of the blow-molded container manufactured in Example 7 are shown in FIGS. 1 (×200) and 2 (×5000). As can be seen from FIGS. 1 and 2, the container manufactured from the nanocomposite composition having barrier properties includes the nanocomposite dispersed in the continuous polyolefin resin to have good barrier properties.

The nanocomposite composition according to an embodiment of the present invention has superior barrier properties and moldability, and thus the article manufactured therefrom has an excellent performance as a container, sheet or film having barrier properties.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dry-blended nanocomposite composition comprising:
   30 to 95 parts by weight of a polyolefin resin;
   0.5 to 60 parts by weight of a melt blend including at least one resin having barrier properties and at least one nanocomposite having barrier properties,
   wherein the at least one resin having barrier properties is selected from the group consisting of an ethylene-vinyl alcohol (EVOH) copolymer, a polyamide, an ionomer and a polyvinyl alcohol (PVA), and
   wherein the at least one nanocomposite having barrier properties is selected from the group consisting of an EVOH copolymer/intercalated clay nanocomposite, a polyamide/intercalated clay nanocomposite, an ionomer/intercalated clay nanocomposite and a polyvinylalcohol/intercalated clay nanocomposite; and
   1 to 30 parts by weight of a compatibilizer,
   wherein the resin having barrier properties, which is selected from the group consisting of an ethylene-vinyl alcohol (EVOH) copolymer, a polyamide, an ionomer and a polyvinyl alcohol (PVA), is not the resin comprised within the nanocomposite, which resin is one of an ethylene-vinyl alcohol (EVOH) copolymer, a polyamide, an ionomer or a polyvinyl alcohol (PVA),
   wherein the resin having barrier property and the nanocomposite having barrier property are molten-blended in a weight ratio from 25:75 to 75:25,
   wherein the intercalated clay comprises 1 to 45 wt % of an organic material, and wherein the organic material has at least one functional group selected from the group consisting of from primary ammonium to quaternary ammonium, phosphonium, maleate, succinate, acrylate, benzylic hydrogen, and oxazoline.

2. The composition of claim 1, wherein the polyolefin resin is at least one compound selected from the group consisting of a high density polyethylene (HDPE), a low density polyethylene (LDPE), a linear low density polyethylene (LLDPE), an ethylene-propylene polymer and an ethylene-propylene copolymer.

3. The composition of claim 1, wherein the intercalated clay is at least one material selected from the group consisting of montmorillonite, bentonite, kaolinite, mica, hectorite, fluorohectorite, saponite, beidelite, nontronite, stevensite, vermiculite, hallosite, volkonskoite, suconite, magadite, and kenyalite.

4. The composition of claim 1, wherein the ethylene-vinyl alcohol copolymer contains 10 to 50 mol % of ethylene.

5. The composition of claim 1, wherein the polyamide is nylon 4.6, nylon 6, nylon 6.6, nylon 6.10, nylon 7, nylon 8, nylon 9, nylon 11, nylon 12, nylon 46, MXD6, amorphous polyamide, a copolymerized polyamide containing at least two of these, or a mixture of at least two of these.

6. The composition of claim 1, wherein the ionomer has a melt index of 0.1 to 10 g/10 min (190° C., 2,160 g).

7. The composition of claim 1, wherein the compatibilizer is one or more compounds selected from the group consisting of an ethylene-ethylene anhydride-acrylic acid copolymer, an ethylene-ethyl acrylate copolymer, an ethylene-alkyl acrylate-acrylic acid copolymer, a maleic anhydride modified (graft) high-density polyethylene, a maleic anhydride modified (graft) linear low-density polyethylene, an ethylene-alkyl (meth)acrylate-(meth)acrylic acid copolymer, an ethylene-butyl acrylate copolymer, an ethylene-vinyl acetate copolymer, and a maleic anhydride modified (graft) ethylene-vinyl acetate copolymer.

8. The composition of claim 1, wherein the resin having barrier properties and the nanocomposite having barrier properties are molten-blended using a co-rotation twin screw extruder or a single screw extruder at the melting point of the resin or higher.

9. The composition of claim 1, wherein the weight ratio of the resin having barrier properties to the intercalated clay in the nanocomposite is 58.0:42.0 to 99.9:0.1.

10. An article manufactured by molding the nanocomposite composition of claim 1.

11. The article of claim 10, manufactured through blow molding, extrusion molding, pressure molding, or injection molding.

12. The article of claim 10, being a container having barrier properties.

13. The article of claim 10, being a pipe having barrier properties.

14. The article of claim 10, being a sheet having barrier properties.

15. The article of claim 12, being a multi-layered container further including an adhesive layer and a polyolefin resin layer.

16. The article of claim 14, being a multi-layered sheet further including an adhesive layer and a polyolefin resin layer.

* * * * *